(12) United States Patent
Acharya (10) Patent No.: US 11,558,070 B1
(45) Date of Patent: Jan. 17, 2023

(54) SYSTEMS AND METHODS FOR FAST AGC CONVERGENCE USING HIGH-SPEED INTERFACE BETWEEN BASEBAND AND RFIC

(71) Applicant: EdgeQ, Inc., Santa Clara, CA (US)

(72) Inventor: Narendra M Acharya, Bangalore (IN)

(73) Assignee: EdgeQ, Inc., Santa Clara, CA (US)

( * ) Notice: Subject to any disclaimer, the term of this patent is extended or adjusted under 35 U.S.C. 154(b) by 0 days.

(21) Appl. No.: 17/390,364

(22) Filed: Jul. 30, 2021

(51) Int. Cl.
H04B 1/04 (2006.01)
H04B 1/00 (2006.01)
H04B 5/00 (2006.01)

(52) U.S. Cl.
CPC .............. *H04B 1/0028* (2013.01); *H04B 1/04* (2013.01); *H04B 5/0056* (2013.01); *H04B 2001/0416* (2013.01)

(58) Field of Classification Search
CPC .. H03G 3/30; H03M 1/12; H04B 1/00; H04B 1/04; H04B 1/12; H04B 1/18; H04B 1/40; H04B 1/0028; H04B 5/0056; H04B 15/00; H04B 2001/0416; H04L 25/02; H04L 25/03; H04L 27/26; H04L 27/28; H04L 27/38
USPC ....... 375/219, 260, 262, 267, 295, 345, 350; 455/63.1, 130, 190.1, 207, 226.1, 230, 455/232.1, 334
See application file for complete search history.

(56) References Cited

U.S. PATENT DOCUMENTS

| | | | | |
|---|---|---|---|---|
| 10,530,611 | B1* | 1/2020 | Manglani | H04L 25/0264 |
| 10,581,406 | B2* | 3/2020 | Tangudu | H01P 1/22 |
| 11,303,312 | B2* | 4/2022 | Gunturi | H04B 1/16 |
| 2011/0026643 | A1* | 2/2011 | Ruelke | H04L 27/3863 375/319 |
| 2016/0241212 | A1* | 8/2016 | Gore | H04B 1/16 |

OTHER PUBLICATIONS

International Search Report and Written Opinion of the International Searching Authority dated Aug. 29, 2022 in related PCT application No. PCT/US2022/037409, (8 pgs).

* cited by examiner

*Primary Examiner* — Shawkat M Ali
(74) *Attorney, Agent, or Firm* — North Weber & Baugh LLP; Michael North (57) ABSTRACT

With advanced compute capabilities and growing convergence of wireless standards, it is desirable to run multiple wireless standards, e.g., 4G, 5G NR, and Wi-Fi, on a single signal processing system. Automatic gain control (AGC) is a process of converging on a gain level for optimum signal reception considering the dynamic range of all the components in the receive chain, including analog and digital parts. For certain wireless standard such as Wi-Fi, AGC is required to complete within a short interval. Both RF and baseband gains have to be adjusted within this short time. Discloses in the present disclosure are embodiments of a high-speed and low pin-count interface between an RF circuit and a baseband circuit for AGC communication. The high-speed interface provides a light-weight serial protocol over one or more low-voltage differential signaling (LVDS) channels to meet a low-latency requirement for gain updates.

20 Claims, 5 Drawing Sheets

SYSTEMS AND METHODS FOR FAST AGC CONVERGENCE USING HIGH-SPEED INTERFACE BETWEEN BASEBAND AND RFIC

TECHNICAL FIELD

The present disclosure relates generally to systems and methods to implement automatic gain control (AGC) for wireless signal processing. More particularly, the present disclosure relates to systems and methods to implement automatic gain control for wireless signal processing across base-band and radio frequency integrated circuit (RFIC).

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc. Different wireless standards have aspects which are very different from each other—fundamental frame structures, timing of symbols, forward error correction (FEC) codes.

With advanced compute capabilities and growing convergence of wireless standards, there is requirement to run multiple wireless standards, e.g., 4G LTE, 5G NR, and Wi-Fi, on a single hardware, e.g., a system on a chip (SoC). This requires simultaneously receiving and transmitting signals corresponding to each radio standard and also process them according to the requirements of the corresponding radio standard. However, typical solutions involve providing separate hardware blocks specific to each radio standard which in turn requires more area on the SoC and consumes more power. As the need for inter-operability among different types of wireless standards increases, improvements in resource flexibility and system configurability will become more important.

Among various processes for signal processing, AGC is a process of converging on a gain level for optimum signal reception considering a dynamic range of all components in a signal receiving chain (analog and digital). For some wireless standard such as Wi-Fi, AGC is required to complete within a short interval, e.g., 2.4p. Both RF and baseband gains have to be adjusted within this short interval. In certain situations. Some RF analog components may be in a different IC from a baseband (BB) IC. Hence a high-speed interface may be needed between the different ICs such that the AGC may be implemented within the required short interval.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a RAT to provide connection between a device, e.g., a mobile phone, and a core network (CN). Open RAN is an approach based on interoperability and standardization of RAN elements including a unified interconnection standard for white-box hardware and open source software elements from different vendors.

Figure 1:
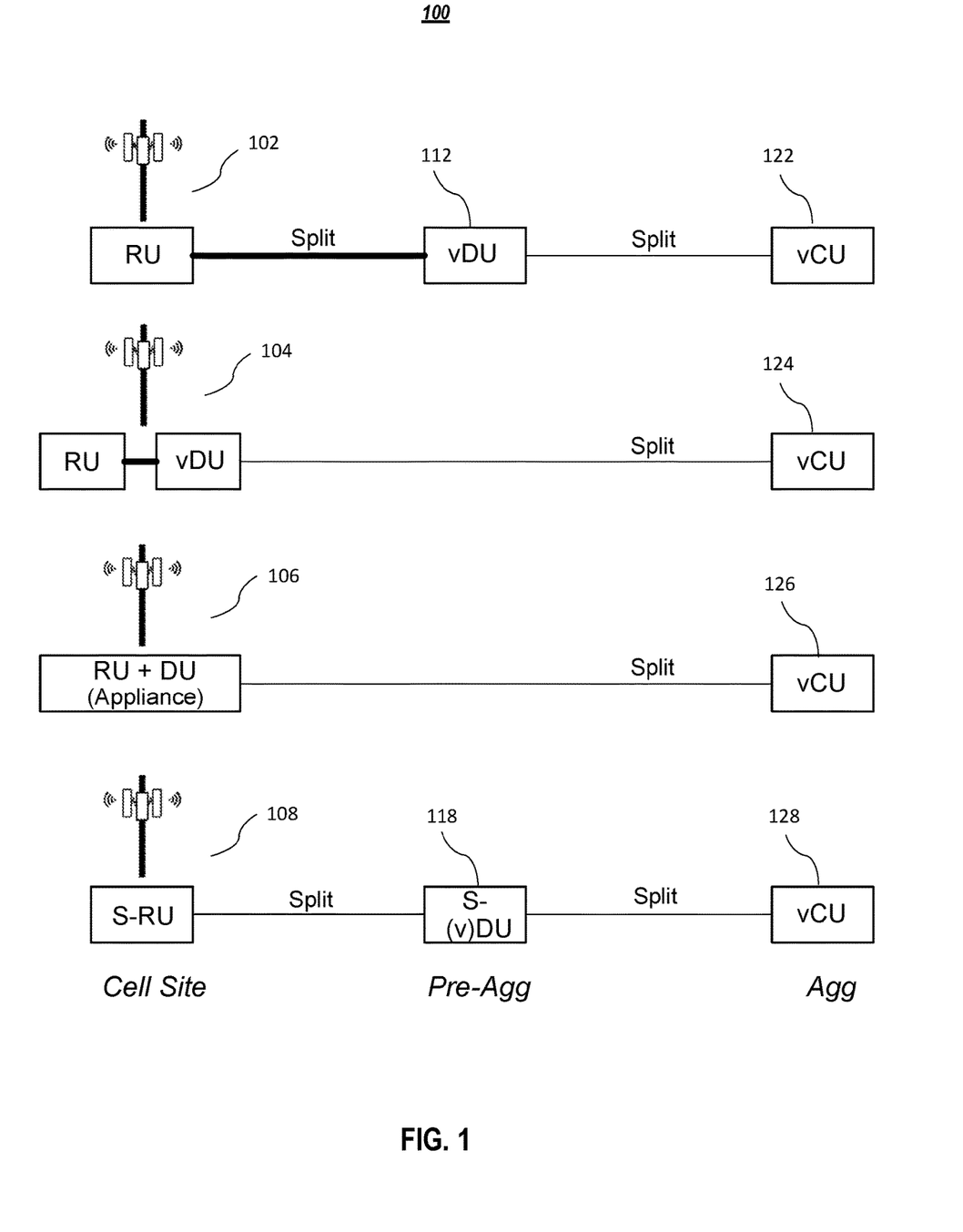
FIG. 1 ("FIG. 1") depicts various open radio access network (RAN) deployments for a telecommunication service provider, according to embodiments of the present disclosure.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a distribution unit (DU) and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

With constant development of Wi-Fi technology, Wi-Fi access points (APs), especially 5G Wi-Fi APs, may transmit or receive signals at a frequency (e.g., 2.4 GHz, 5 GHz, or 6 GHz) within the frequency range 1 (FR1) for 5G communication. An RU serving 5G communications may also be configured for transmitting or receiving 5G Wi-Fi signals. Accordingly, a 5G station or a 5G femtocell may be deployed to serve both 5G and Wi-Fi communications. However, using specialized or separate hardware to separately process the 5G and Wi-Fi standards would result in complex hardware, increase power consumption for operation, and drive up the cost of the of the whole system. It would be desirable to have a unified or at least partially unified hardware that may be configured for simultaneous transmission and reception of different radio access technologies, including Wi-Fi.

B. Embodiments for AGC Between Baseband and RFIC

Figure 2:
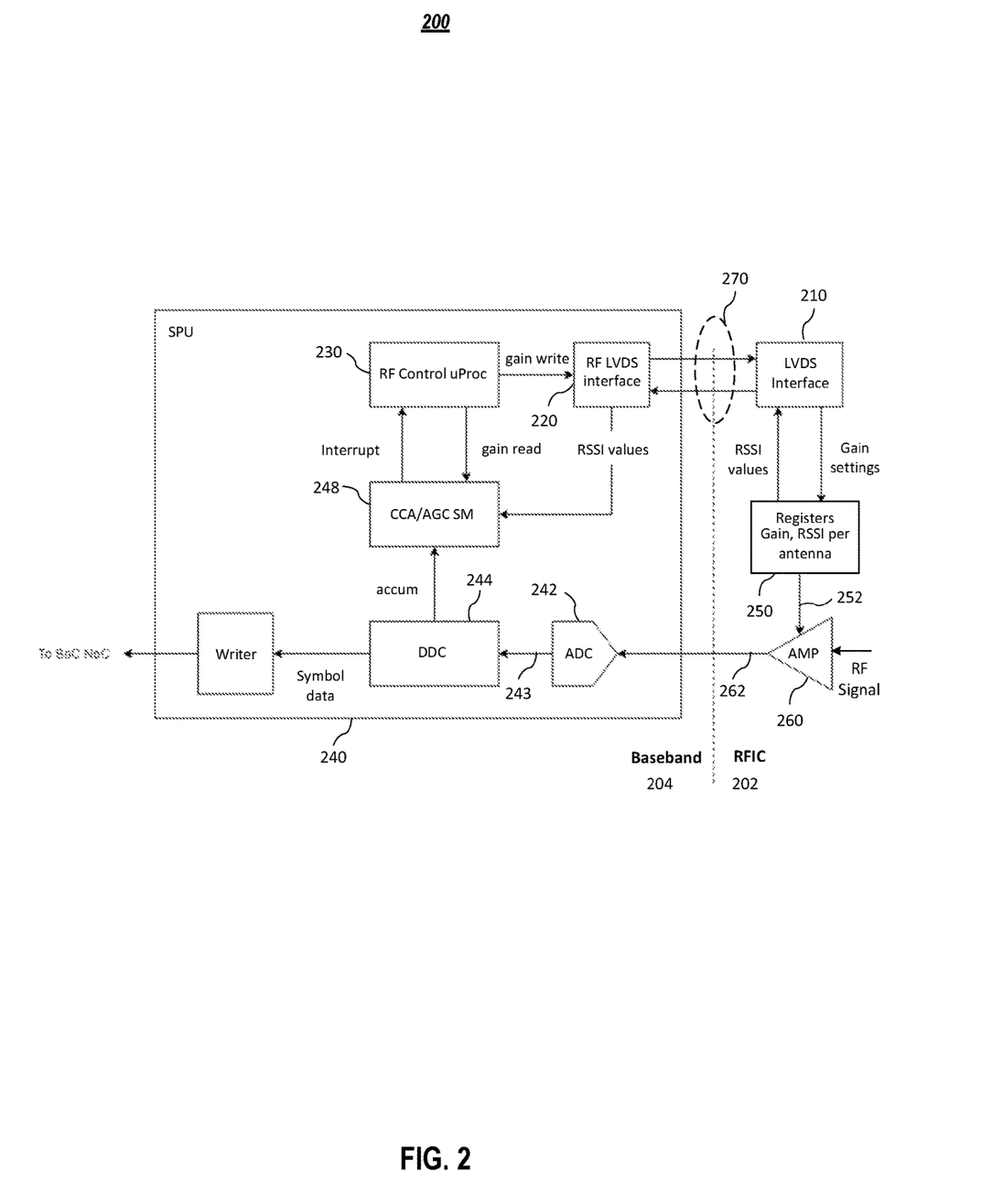
FIG. 2 depicts unified signal processing system with support for AGC and an RFIC interface on a signal reception path, according to embodiments of the present disclosure.

FIG. 2 depicts unified signal processing system with support for automatic gain control (AGC) and an RFIC interface on a signal reception path, according to embodiments of the present disclosure. The unified hardware comprises a baseband circuit 204 and a RFIC 202. The baseband circuit 204 and the RFIC 202 may be integrated respectively as two separate chips. The RFIC 202 comprises at least a communication interface 210 for communication with the baseband circuit 204, one or more registers 250, and an amplifier 260. A signal processing unit (SPU) 240 is integrated within the baseband circuit. The SPU 240 comprises an RF controller 230, and an RF communication interface 220, which communicates to the communication interface 210 via a communication protocol. The RF controller 230 may perform operations, e.g., gain writing, to the RF communication interface 220 such that one or more gain settings may be transmitted to the RFIC 202 for gain updates. In one or more embodiments, the between the RF communication interface 220 and the communication interface 210 may be a low-voltage differential signaling (LVDS) interface, with the communication protocol as a serial protocol that runs through one or more LVDS channels 270 to support high-speed communication between the RF communication interface 220 and the communication interface 210. Such a high-speed, low-overhead interface may achieve a latency of under 100 ns per update.

The one or more registers 250 stores one or more measurements for the RF signal received at the RFIC 202, e.g., received signal strength indicator (RSSI) and one or more gain settings per antenna for one or more frequency bands. The amplifier 260 performs signal amplification using the gain settings stored at one or more registers 250 to output an amplified signal 262, which is then converted by an analog-to digital converter (ADC) 242 into a digital signal 243. The communication interface 210 couples to the one or more registers 250 to read the RSSI values, which are transmitted to the RF communication interface 220, and write one or more gain settings, which are transmitted to the RF communication interface 220.

The digital signal 243 is processed by a digital down converter (DDC) unit 244, which comprises multiple DDCs with each DDC having respective mixer and filter for independent operation. The digital signal 243 may be disaggregated in the DDC unit 244 into different outputs corresponding to different RATs. Output from each DDC in the DDC unit 244 are accumulatively fed (e.g., accumulated over a predetermined interval, such as 400 ns) into an automatic gain control (AGC) unit 248 for gain control. The AGC unit 248 may also implement clear channel assessment (CCA) to determine if one or more RF bands are busy or not in use. Parameters for gains applied to each DDC output may be read by the AGC unit 248 from the RF controller 230. On the other hand, outputs from the AGC unit 248 may be sent to the RF controller 230, and/or sent to the RF programming interface 220 via direct hardware path for RSSI and gain programming. In one or more embodiments, the AGC unit may comprise a software-assisted hardware finite-state machine (FSM) to control the AGC process for gain updates.

In one or more embodiments, the AGC unit 248 in the baseband 204 requires a continuous input of the signal levels (e.g., RSSI) in the RFIC 202 to estimate gain updates and send back the estimations to RFIC 202 for implementation. In one or more embodiments, a high-speed interface between baseband and RFIC is utilized to support high-speed baseband-RFIC communication. The high-speed interface may use a light-weight serial protocol that runs at a predetermined frequency (e.g., 400 MHz) through one or more LVDS channels 270. Such an approach may provide a custom protocol optimized for AGC. In contrast, a parallel source synchronous bus for low-latency communication for AGC between baseband-RFIC may involve 8-bit along with a clock signal. Although such a parallel interface may run at lower speeds (e.g., around 50 MHz) where skew and timing requirements may be met, the parallel interface need a higher pin-count and strict timing budgets. Compared to the parallel interface, the serial protocol disclosed in the present patent document utilizes fewer pins and reduces the complexity of digital logic on the RFIC side. More details of the serial protocol and protocol implementations are disclosed in FIGS. 4-5 and associated descriptions.

The baseband may be operated to support AGC control with a convergence range, e.g., over 70 dB, in a short interval, e.g., less than 2.4 μs, for a fast path to RFIC for quick gain changes. The SPU may be operated for fast detection of Wi-Fi preamble to facilitate Wi-Fi receiving. The total loop for an iteration of AGC may be achieved at 820 ns.

Figure 3:
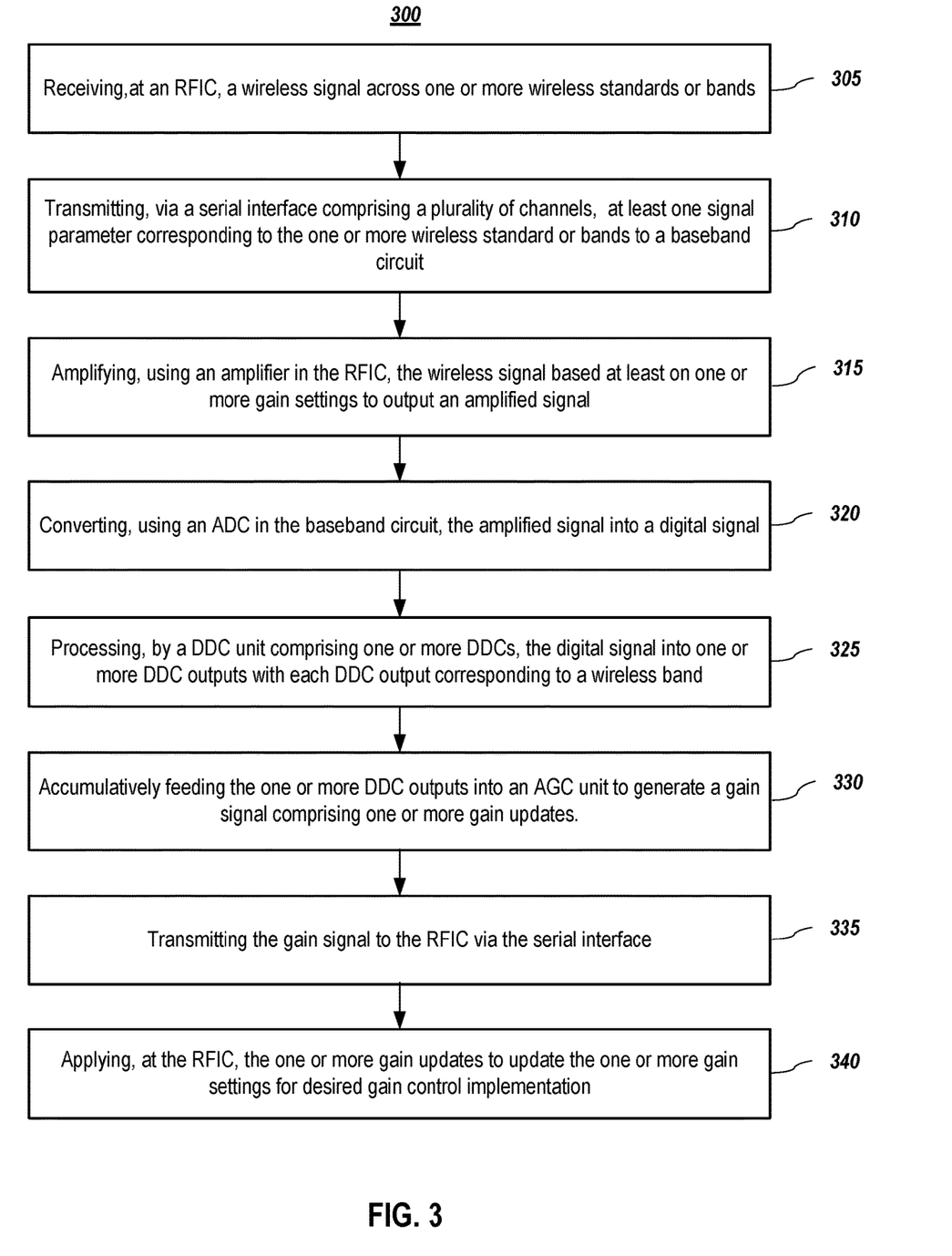
FIG. 3 depicts a process of baseband-RFIC communication for AGC implementation, according to embodiments of the present disclosure.

FIG. 3 depicts a process of baseband-RFIC communication for AGC implementation, according to embodiments of the present disclosure. In step 305, an RFIC receives a wireless signal across one or more wireless standard (or bands), e.g., 5G, LTE, or Wi-Fi, etc. In step 310, at least one signal parameter, e.g., register gains and/or received signal strength indicator (RSSI), corresponding to the one or more wireless standard (or bands), is transmitted to the baseband circuit via a serial interface comprising a plurality of channels. In one or more embodiments, the serial interface uses a serial protocol running at a predetermined frequency (e.g., 400 MHz) over an LVDS channel. In step 315, the wireless signal is amplified, by an amplifier, based at least on one or more gain settings, to output an amplified signal. In step 320, the amplified signal is then converted, by an ADC in the baseband circuit, into a digital signal. In step 325, the digital signal is processed, by a DDC unit comprising one or more DDCs, into one or more DDC outputs with each DDC output corresponding to a wireless band. In step 330, the one or more DDC outputs in the DDC unit are accumulatively fed (accumulated over a predetermined interval and then fed) into an AGC unit to generate a gain signal comprising one or more gain updates. In step 335, the gain signal is transmitted to the RFIC via the serial interface. In step 340, the RFIC applied the one or more gain updates to update the one or more gain settings for desired gain control implementation.

C. Embodiments of Protocol for Interface Between Baseband and RFIC

In one or more embodiments, the AGC process is controlled by a software-assisted hardware FSM in a base-band circuit (e.g., an integrated circuit or IC). The FSM may need at least two types of measurements, including signal strength (e.g., RSSI) measurement performed in the RFIC and energy measurement after analog-to-digital conversion in the baseband.

Figure 4:
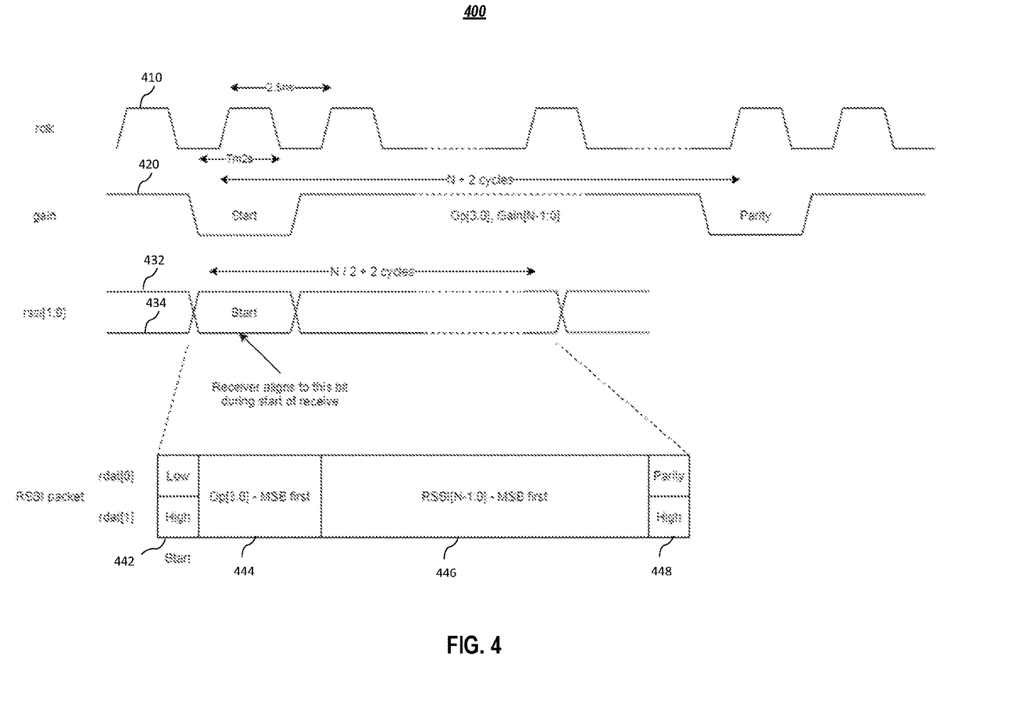
FIG. 4 graphically depicts a serial baseband-RFIC interface protocol, according to embodiments of the present disclosure.

FIG. 4 graphically depicts a serial baseband-RFIC interface protocol, according to embodiments of the present disclosure. Each signal (e.g., the clock signal 410, the gain signal 420, the RSSI signals 432 and 434) shown in FIG. 4 may be a differential signal across a pair of complementary signals. In one or more embodiments, the RSSI in the wireless signal may be sampled in the RFIC at a rate of approximately 20 Msps (million samples per second) and produce multiple bits (e.g., 32 bits) of data per sample. This translates to 640 Mbps data rate which may be achieved using two LVDS channels (for a RSSI signal with two digits) operating at 400 MHz. Both LVDS channels may be source synchronous to a clock signal 410 which is transmitted over a third LVDS channel. The interface protocol for RSSI transmission, as shown in FIG. 4, comprises an in-band start bit 442 to denote start of transmission, a 4-bit operation code (op-code) 444 to determine type of a signal parameter or measurement data (e.g., RSSI) being sent, multiple bits of measurement data 446 with the MSB starting first, and a parity bit 448. A receiver in a data transmission session aligns to the start bit 442 during start of receiving. Some examples for the interface protocol for AGC are shown in Table 1 below.

Using an LVDS channel may be effective in shielding external interference without using a high voltage for signal transmission because the "real" information relates to electrical difference between the two signals, rather than the difference between a single wire and ground. Since external interference tends to affect both wires identically, information for transmission is unaffected. Also, an LVDS channel uses signals of equal and opposite polarity, interference from the signals in the LVDS channel for nearby circuits tend to cancel out.

TABLE 1

Exemplary interface protocol for AGC

| Op[2] | Op[1:0] | Data (Gain or RSSI) |
|---|---|---|
| 0-BB | 3'b00 | {R × 1, R × 0} N = 16 bits |
| 1-RF | 3'b01 | {R × 3, R × 2} N = 16 bits |
| | 3'b1× | {R × 3, R × 2, R × 1, R × 0} N = 32 bits |

Figure 5:
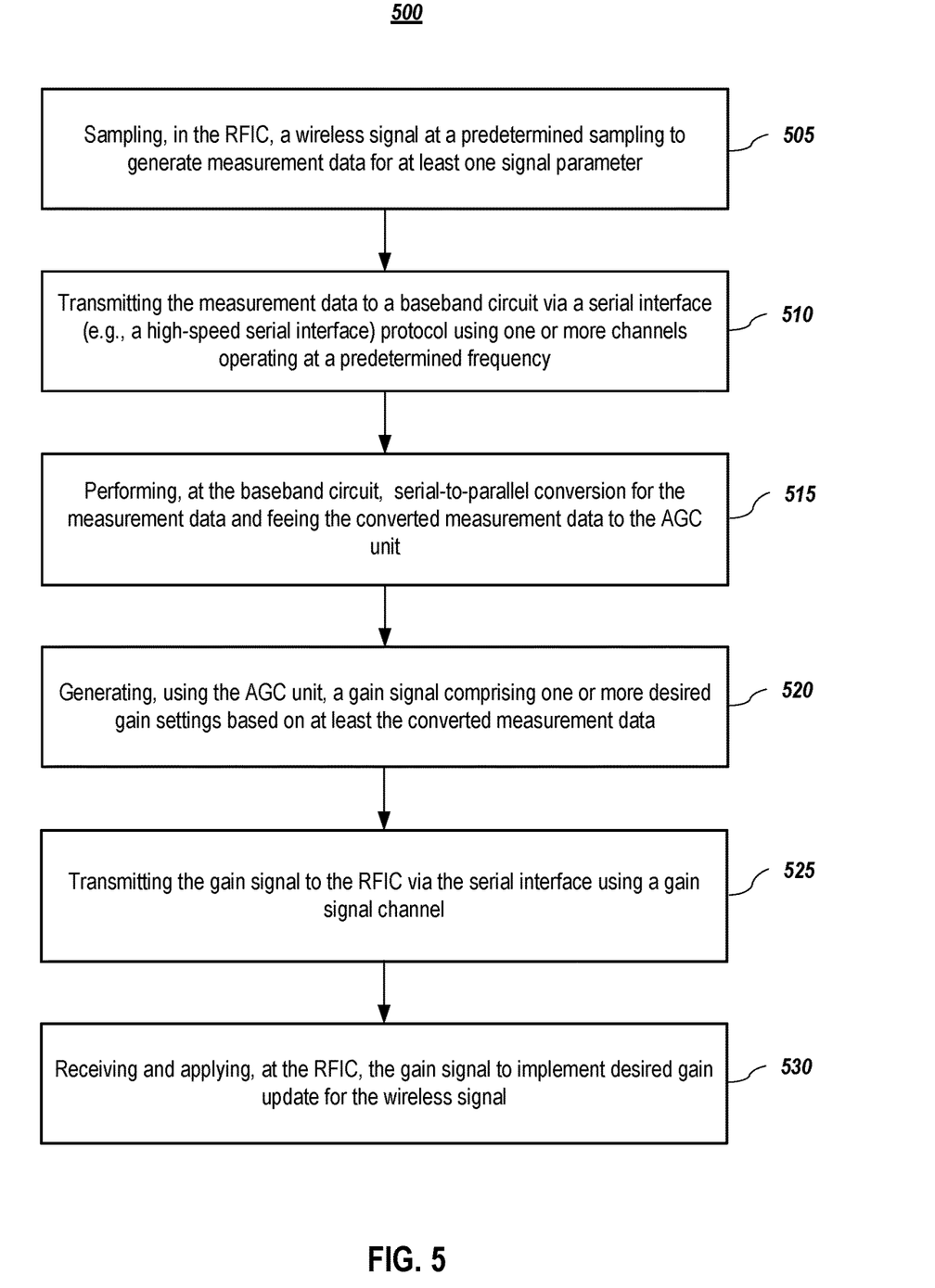
FIG. 5 depicts a process of baseband-RFIC interface protocol implementation, according to embodiments of the present disclosure.

FIG. 5 depicts a process of baseband-RFIC interface protocol implementation, according to embodiments of the present disclosure. In step 505, a wireless signal is sampled in the RFIC at a predetermined sampling rate (e.g., 20 Msps) to generate measurement data for at least one signal parameter (e.g., RSSI). In step 510, the measurement data are transmitted to the baseband circuit via a serial interface (e.g., a high-speed serial interface) protocol using one or more channels operating at a predetermined frequency (e.g., 400 MHz). The one or more channels may be LVDS channels, as shown in FIG. 4. In step 515, the baseband circuit performs serial-to-parallel conversion for the measurement data and feeds the converted measurement data to the AGC unit. In step 520, the AGC unit (or AGC FSM) generates a gain signal 420 comprising one or more gain updates based on at least the converted measurement data. The gain signal may be 32-bit or 48-bit depending on type of the value. In one or more embodiments, the one or more desired gain settings are computed further based on energy measurement performed one the baseband circuit after an analog-to-digital conversion. In step 525, the gain signal is transmitted to the RFIC via the serial interface using a gain signal channel, which may also be an LVDS channel and also source synchronous running at 400 MHz. In step 530, the gain signal is received in the RFIC, converted to parallel and applied in the RFIC to implement desired gain update for the wireless signal.

Latency of the gain update is critical to AGC implementation. A latency of under 100 ns per update may be achieved using embodiments of the disclosed high-speed, low-overhead interface. Although FIG. 4 shows a serial baseband-RFIC interface protocol using two RSSI channels 432 and 434, one skilled in the art shall understand different numbers of RSSI channels may also be applicable and embodiments of the disclosed baseband-RFIC interface protocol may also be used for communication of signal measurements other than RSSI. Such variations shall be within the scope of the present patent disclosure.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for implementing automatic gain control (AGC) comprising:
   receiving, at a radio-frequency integrated circuit (RFIC), a wireless signal across one or more wireless standards or bands;
   transmitting, via a serial interface using a plurality of channels in the RFIC, at least one signal parameter of the wireless signal to a baseband circuit;
   amplifying, using an amplifier in the RFIC, the wireless signal based on one or more gain settings to output an amplified signal;
   converting, using an analog-to-digital converter (ADC) in the baseband circuit, the amplified signal into a digital signal;
   processing, by a digital down converter (DDC) unit comprising one or more DDCs, the digital signal into one or more DDC outputs with each of the one or more DDC outputs corresponding to one of the one or more wireless standards or bands, the one or more DDC outputs are accumulatively fed into an AGC unit in the baseband circuit;
   generating, using the AGC unit, a gain signal comprising one or more gain updates based on the at least one signal parameter and the accumulatively fed DDC outputs;
   transmitting, via the serial interface, the gain signal to the RFIC; and
   applying, at the RFIC, one or more gain updates in the gain signal to update the one or more gain settings for a desired gain control implementation.

2. The method of claim 1, wherein the wireless signal is a Wi-Fi signal.

3. The method of claim 1, wherein the at least one signal parameter comprises a received signal strength indicator (RSSI).

4. The method of claim 1, wherein the one or more channels comprise one or more low-voltage differential signaling (LVDS) channels.

5. The method of claim 4, wherein the at least one signal parameter is transmitted using two LVDS channels that are source synchronous to a clock signal, the clock signal is transmitted over a third LVDS channel.

6. The method of claim 5, wherein the two LVDS channels use a serial protocol operating at a predetermined frequency.

7. The method of claim 6, wherein the serial protocol comprises an in-band start bit to denote start of transmission, a multi-bit operation code to determine type of measurement being sent, multiple bits of measurement data, and a parity bit.

8. The method of claim 5, wherein the gain signal is transmitted via an LVDS channel that is source synchronous to the clock signal.

9. The method of claim 5, wherein the gain signal is different from the two LVDS channels for transmitting the at least one signal parameter.

10. A system for implementing automatic gain control (AGC) comprising:
   a radio-frequency integrated circuit (RFIC) to receive a wireless signal across one or more wireless standards or bands, the RFIC comprising:
      one or more registers to store at least one signal parameter for the wireless signal and one or more gain settings;
      an amplifier that amplifies the wireless signal based on the one or more gain settings to output an amplified signal; and
      a communication interface coupled to the one or more registers, the communication interface reads the at least one signal parameter for transmitting;
   a baseband circuit coupled to the RFIC to receive the amplified signal for signal processing, the baseband circuit comprising:
      a radio-frequency (RF) communication interface coupled to the communication interface in the RFIC via one or more serial channels, the RF communication interface receives the at least one signal parameter from the communication interface;
      an analog-to-digital converter (ADC) to convert the amplified signal into a digital signal;
      a digital down converter (DDC) unit comprising one or more DDCs to process the digital signal into one or more DDC outputs; and
      an AGC unit coupled to the RF communication interface and the DDC unit, the AGC unit generates a gain signal comprising one or more gain updates based on the at least one signal parameter and the one or more DDC outputs, the gain signal is transmitted from the RF communication interface to the communication interface in the RFIC to update the one or more gain settings for a desired gain control implementation.

11. The system of claim 10, wherein the wireless signal is a Wi-Fi signal.

12. The system of claim 10, wherein the at least one signal parameter comprises a received signal strength indicator (RSSI).

13. The system of claim 10, wherein the one or more channels comprises multiple low-voltage differential signaling (LVDS) channels.

14. The system of claim 13, wherein the at least one signal parameter is transmitted using two LVDS channels that are source synchronous to a clock signal, the clock signal is transmitted over a third LVDS channel.

15. The system of claim 14, wherein the two LVDS channels use a serial protocol operating at a predetermined frequency.

16. The system of claim 15, wherein the serial protocol comprises an in-band start bit to denote start of transmission, a multi-bit operation code to determine type of a signal parameter being sent, multiple bits of measurement data, and a parity bit.

17. The system of claim 14, wherein the gain signal is transmitted via an LVDS channel that is different from the two LVDS channels for transmitting the at least one signal parameter.

18. A method for implementing automatic gain control (AGC) comprising:
   transmitting, via one or more channels through a communication interface, at least one signal parameter for a wireless signal from a radio-frequency integrated circuit (RFIC) to a baseband circuit, the one or more channels are low-voltage differential signaling (LVDS) channels that use a serial protocol operating at a predetermined frequency;
   generating, using the baseband circuit, a gain signal comprising one or more gain updates based on the at least one signal parameter; and
   transmitting, via a channel through the communication interface, the gain signal to the RFIC for gain update in the RFIC, the channel for gain signal transmission is an LVDS channel different from the one or more channels for transmitting the at least one signal parameter.

19. The method of claim 18, wherein the one or more channels for transmitting the at least one signal parameter and the channel for the gain signal transmission are source synchronous to a clock signal.

20. The method of claim 18, wherein the serial protocol comprises an in-band start bit to denote start of transmission, a multi-bit operation code to determine type of a signal parameter being sent, multiple bits of measurement data, and a parity bit.

* * * * *